United States Patent
Ellmer

(10) Patent No.: US 11,384,668 B2
(45) Date of Patent: Jul. 12, 2022

(54) METHOD AND DEVICE FOR MANAGING THE TEMPERATURE OF AN EXHAUST GAS AFTERTREATMENT SYSTEM OF A POLLUTANT-DISCHARGING MOTOR VEHICLE

(71) Applicant: Vitesco Technologies GmbH, Hannover (DE)

(72) Inventor: Dietmar Ellmer, Regensburg (DE)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 17/213,407

(22) Filed: Mar. 26, 2021

(65) Prior Publication Data

US 2021/0215076 A1 Jul. 15, 2021

Related U.S. Application Data

(63) Continuation of application No. PCT/EP2019/076183, filed on Sep. 27, 2019.

(30) Foreign Application Priority Data

Oct. 8, 2018 (DE) .......................... 102018217165.3
Apr. 10, 2019 (DE) .......................... 102019205128.6

(51) Int. Cl.
*F01N 3/20* (2006.01)
*F01N 3/021* (2006.01)

(52) U.S. Cl.
CPC ........... *F01N 3/2006* (2013.01); *F01N 3/021* (2013.01); *F01N 3/2066* (2013.01); *F02D 2200/0802* (2013.01)

(58) Field of Classification Search
CPC combination set(s) only.
See application file for complete search history.

(56) References Cited

U.S. PATENT DOCUMENTS 6,032,461 A * 3/2000 Kinugasa .............. F02D 41/029
60/295
10,301,991 B1 * 5/2019 Dudar ................ F02M 25/0872
(Continued)

FOREIGN PATENT DOCUMENTS

DE 102014216217 A1 2/2016
DE 102016014854 A1 7/2017
(Continued)

OTHER PUBLICATIONS

International Search Report and Written Opinion dated Sep. 27, 2019 from corresponding International Patent Application No. PCT/EP2019/076183.

*Primary Examiner* — Binh Q Tran

(57) ABSTRACT

A method for actuating a heat source for a component of an exhaust system of a drive of a motor vehicle is described. The method includes providing information items relating to a future traveling route of the motor vehicle; ascertaining a chronological sequence of a multiplicity of temperature values in the component within a predefined future time segment, where the ascertainment of the chronological sequence is based on the provided information items; determining a point in time within the time segment on the basis of the ascertained chronological sequence, where a temperature value of the multiplicity of temperature values which is assigned to the point in time is intended to satisfy a predefined criterion; and actuating the heat source before the point in time such that the temperature value satisfies the specified criterion at the point in time.

19 Claims, 2 Drawing Sheets

(56) References Cited

U.S. PATENT DOCUMENTS

| | | | | |
|---|---|---|---|---|
| 2012/0255279 | A1* | 10/2012 | Atluri | F01N 3/027 |
| | | | | 60/274 |
| 2014/0052353 | A1* | 2/2014 | Sujan | F01N 9/002 |
| | | | | 701/53 |
| 2016/0114790 | A1* | 4/2016 | Bruce | B60W 20/16 |
| | | | | 701/22 |
| 2017/0130635 | A1* | 5/2017 | Smith | B60K 6/24 |
| 2017/0235310 | A1 | 8/2017 | Miyake | |
| 2018/0340785 | A1* | 11/2018 | Upadhyay | G01C 21/3617 |

FOREIGN PATENT DOCUMENTS

| | | |
|---|---|---|
| DE | 102016213147 A1 | 1/2018 |
| DE | 102017212909 A1 | 1/2019 |

\* cited by examiner

METHOD AND DEVICE FOR MANAGING THE TEMPERATURE OF AN EXHAUST GAS AFTERTREATMENT SYSTEM OF A POLLUTANT-DISCHARGING MOTOR VEHICLE

CROSS-REFERENCE TO RELATED APPLICATIONS

This application claims the benefit of PCT Application PCT/EP2019/076183, filed Sep. 27, 2019, which claims priority to German Application DE 10 2019 205 128.6 filed Apr. 10, 2019 and to German Application DE 10 2018 217 165.3 filed Oct. 8, 2018. The disclosures of the above applications are incorporated herein by reference.

TECHNICAL FIELD

The disclosure relates generally to the technical field of exhaust-gas purification. The disclosure relates to a method and a control unit for actuating a heat source for a component in an exhaust system of a motor vehicle, and to a motor vehicle having such a control unit.

BACKGROUND

In motor vehicles with internal combustion engines, ever stricter legal regulations make it necessary, on the one hand, to reduce as far as possible the untreated emissions caused by the combustion of the air/fuel mixture in the cylinders. On the other hand, in internal combustion engines, use is made of exhaust-gas aftertreatment systems which convert the pollutant emissions which are generated during the combustion process of the air/fuel mixture in the cylinder into non-harmful substances.

The present and future measures required by society and the legislature for reducing pollutants include two main trends, namely compliance with the emissions limit values not only on the test stand but also during real operation of the motor vehicle and reduction of CO2 emissions and fuel consumption, or minimal usage of energy.

Exhaust-gas aftertreatment systems for internal combustion engines require different temperature windows during real driving operation in order to achieve or maintain optimum conversion rates or efficiencies in the short term (milliseconds to seconds), medium term (minutes to an hour) or long term (days or longer). Such a temperature window to be attained in the short term is the typical conversion window starting from the light-off temperature up to the maximum admissible temperature (component protection) of a three-way catalytic converter.

With regard to its effectiveness, a NOx storage catalytic converter likewise has a temperature window to be attained in the short-term or medium-term, which temperature window is narrower than the temperature window of a three-way catalytic converter.

By contrast, a regeneration of a particle filter requires a relatively wide temperature window in the long term, because the burn-off of the filter cake begins in the presence of available oxygen above approximately 600° C., and local overheating of the exhaust-gas catalytic converter by the heat released during the burn-off must be prevented. Irrespective of the fuel used, these temperature windows must be attained either generally or with regularity that is dependent on various parameters and coupled to the abovementioned time windows.

The following further known processes require special temperature windows: a) desulfurization of exhaust-gas catalytic converters (high temperatures, long-term with regard to fuel quality); b) effectiveness of the SCR (selective catalytic reduction) system (180° C.-550° C.)

Motor vehicles have one or more heat sources that make it possible to attain these temperature windows of the abovementioned exhaust-gas aftertreatment components with regard to the required point in time. This may involve combustion-related measures or the activation of an electrical heating device for the exhaust-gas aftertreatment components, for example an electrical heating disk in an exhaust-gas catalytic converter.

A disadvantage here is that the point in time of the required implementation is known only vaguely, that is to say not with sufficient accuracy. On the other hand, the boundary conditions often do not necessarily result in a need to implement such a temperature window, in particular in the case of motor vehicles that have a hybrid drive. In the context of this application, the hybrid drive is to be understood as being composed of at least two types of drive, wherein one type of drive generates pollutants during operation, necessitating aftertreatment (catalysis, filtering, storage and regeneration, etc.) and, for this, requiring such temperature windows of the exhaust-gas aftertreatment system. An internal combustion engine is mentioned here as an example.

The second and further drive source may be of the same type or may ideally generate lower or less critical levels of pollutants, or no pollutants at all, during operation. An electric machine is mentioned here as an example.

These drive sources are commonly used with a view to minimizing the total amount of energy used. This is impaired with regard to the abovementioned disadvantage.

The following example is intended to explain the facts:

A plug-in hybrid makes it possible to cover several kilometers without activating the internal combustion engine. If the entire route of a real journey can be covered without activating the internal combustion engine, heating-up of the exhaust-gas aftertreatment system with additional energy expenditure would be entirely superfluous. Even the heating-up of an entire catalytic converter or of an entire exhaust-gas aftertreatment system (for example the second section of an exhaust-gas aftertreatment system, which is activated only in the presence of a high power demand) may be unnecessary if the internal combustion engine is used in a driving cycle with a low power demand (for example short city trips).

A common option is to include the driver in the temperature management strategy by way of a corresponding decision via a human/machine interface (HMI). In the example of the plug-in hybrid vehicle selected above, the driver can, by selecting purely electrical operation, prevent this unnecessary use of energy for heating up the exhaust-gas aftertreatment system.

SUMMARY

The disclosure is therefore based on the object of controlling the temperature in an exhaust system as efficiently as possible.

According to a first aspect of the disclosure, a method for actuating a heat source for a component of an exhaust system of a drive of a motor vehicle is described. The method includes (a) providing information items relating to a future traveling route of the motor vehicle; (b) ascertaining a chronological sequence of a multiplicity of temperature values in the component within a predefined future time segment, wherein the ascertainment of the chronological sequence is based on the provided information items; (c) determining a point in time within the time segment on the basis of the ascertained chronological sequence, where a temperature value of the multiplicity of temperature values which is assigned to the point in time is intended to satisfy a predefined criterion; and (d) actuating the heat source before the point in time such that the temperature value satisfies the specified criterion at the point in time.

The described method is based on the recognition that the temperature of components in the exhaust system can, with the aid of a temperature management system, be controlled in closed-loop fashion such that the drive emits the lowest possible level of pollutants, with the lowest possible energy expenditure by the drive. This is advantageous in the case of hybrid systems in which an internal combustion engine may be inactive for relatively long periods of time, for which reason required operating temperatures of the components in the exhaust system may not be reached. Detailed predictive temperature management is made possible by a wide range of information items that are available in the context of ever-increasing automation of driving, up to and including fully autonomous driving.

The term "exhaust system" in this document refers to all parts of an exhaust-gas installation. The exhaust-gas installation includes all "components" whose function is at least partially directed toward processing, for example a conversion, and/or transporting of exhaust gas. Components of the exhaust system may be all units that are physically arranged in the exhaust system such that they at least partially come into contact with the exhaust gas. The components may be connected fluidically downstream of a combustion chamber of the internal combustion engine.

Components of the exhaust system may be lines or pipes that discharge the exhaust gas from a vehicle, for example, from an engine compartment to the exterior of the vehicle, such as an exhaust manifold or a Y-pipe. Such lines and pipes may however also include an exhaust-gas recirculation (EGR) arrangement, in which exhaust gases are entirely or partially admixed to the combustion air to be supplied to the engine.

Components may also be or include flaps, valves or regulators with which the gas flow, that is to say the mass flow or mass flow rate of the gas, through the exhaust system can be controlled.

Components may be exhaust-gas aftertreatment units, such as exhaust-gas purification units, which are configured for the aftertreatment of exhaust gas, such as for the purification of exhaust gas, for example a catalytic converter or a filter, such as a particle filter, for example a soot filter. The catalytic converter may for example be an oxidation catalytic converter, a three-way catalytic converter, a $NO_x$ storage catalytic converter, an SCR (selective catalytic reduction) catalytic converter or a four-way catalytic converter, which combines a three-way catalytic converter with a particle filter. The catalytic converter may be a pre-catalytic converter mounted close to the engine or a main catalytic converter mounted on the underbody of the vehicle. It may be a heated catalytic converter, such as an electrically heated catalytic converter.

Components may optionally reduce exhaust-gas noises, for example one component may be a muffler. A component may for example also be a turbocharger which uses kinetic and/or thermal energy from the exhaust-gas flow for the engine power and thus increases the efficiency of the associated internal combustion engine. For example, a turbocharger can, by way of a turbine arranged in an exhaust system, drive a compressor which increases the pressure in the intake system of the engine and thus provides more combustion air to the engine.

A "drive" of a motor vehicle may be any device that contributes to the movement of the motor vehicle, such as to a translational movement of the motor vehicle in relation to the surroundings. For this purpose, a drive may generate kinetic energy from another form of energy, for example from chemical or electrical energy. A drive may for example be an electric drive which at least partially converts electrical energy into kinetic energy, such as an electric motor or an electric machine. A drive may be an internal combustion engine that can at least partially convert energy stored in a fuel into kinetic energy. A drive may also be a hybrid drive, that is to say the drive may combine several types of drive. For example, a drive may have an internal combustion engine and an electric motor.

An "internal combustion engine" or combustion machine is a machine in which mechanical work is performed through combustion of fuel or fuel mixtures. A fuel may for example be a liquid fuel such as gasoline or diesel oil, though may also be a gas. The fuel mixtures may for example be composed of gaseous components and liquid fuels. An internal combustion engine may be a combustion motor, such as a gasoline engine or a diesel engine.

A "motor vehicle" may be any vehicle driven by an internal combustion engine, for example a motor car, a motorcycle or a tractor vehicle.

The future "traveling route" or a future driving cycle may be a specific driving route between a starting point and a destination. The starting point may be such as the present position of the vehicle. The traveling route may also merely designate a particular class of driving routes, for example city trips, an overland trip, a motorway trip or a combination of such classes of driving routes. The traveling route may be a statistical combination of a multiplicity of specific individual traveling routes, wherein the specific traveling routes may be weighted equally or differently. The traveling route may designate the entire planned route to the destination or else only a part of the entire route. The part may lie in the immediate future or else in the more distant future before the destination. For example, the future traveling route may be a time segment which is or has the next minute, such as the next five minutes, such as the next hour.

"Information items" relating to a future traveling route may be any kind of properties of the traveling route. For example, they may include a present position of the vehicle, which may be determined via GPS or else may be input by a user. They may include a destination that can be input by a user. The information items may also include data relating to past traveling routes of the vehicle or else relating to traveling routes of other vehicles. For example, the present destination may be predictable from such data.

The information items may such as include information items that may be relevant for the energy management and/or the temperature management of the drive, such as of the internal combustion engine. Among other things, the information items may include an altitude profile of the future traveling route. They may include traffic regulations, for example by way of traffic signs or traffic signals, for example the admissible maximum speed on the planned traveling route. They may include present circumstances, for example roadworks, slow-moving traffic, traffic jams or accidents. They may include data from driver assistance systems, for example video data from cameras, audio data from microphones or, in general, sensor data from various sensors of the driver assistance systems. For example, information items relating to objects or events in the vicinity of the automobile may be reconstructed from such data. The information items may include data relating to the road condition, for example relating to the road surface on the traveling route or relating to the width and/or the number of available driving lanes. Finally, the information items may include data relating to the present, past and/or future weather on the traveling route, for example relating to wind strength and wind direction or relating to precipitation such as rain or snow, for example relating to how the precipitation affects the road conditions.

The "ascertainment" of a temperature value may be a modeling of the temperature value, such as a forecast, prognosis or prediction of the temperature value on the basis of models. Here, the modeling of the temperature value may be based on measured data, for example one or more measured temperature values. The modeled temperature value may also be checked using temperature values which have been measured or are to be measured. The temperature value may be ascertained at any desired locations in the exhaust system, inter alia within or at a component and/or within, on the surface or in the vicinity of a heating device.

The temperature value may be a temperature value averaged over a predefined spatial region and/or a predefined time period. It may also be a maximum value or a minimum value in a predefined spatial region and/or in a predefined time period. The predefined spatial region may for example be the interior of a component and/or the predefined time period may for example be the time interval between two modeling steps.

The ascertainment of the chronological sequence of temperature values may be performed with the aid of an exhaust system temperature model. The exhaust system temperature model may model local temperatures in the exhaust system, such as temperatures in or at components in the exhaust system. The temperature model may be assisted, corrected and/or adapted by way of temperature measurement values from one or more sensors. The modeling may be spatially discrete or spatially continuous and also temporally discrete or temporally continuous. Modeling may be performed with different spatial and also temporal resolutions, for example with a frequency of less than 10 Hz, such as less than 1 Hz, and/or a frequency of greater than 1 Hz, such as greater than 10 Hz.

A modeling unit for the ascertainment of the temperature values may be arranged at the drive, at least within the associated motor vehicle. The modeling unit may access data or processes that are located outside the vehicle, for example in a cloud. The modeling unit may be functionally connected to a control unit that controls one or more heat sources.

The exhaust system temperature model may depend on the geometry of the exhaust system and on the materials of the components in the exhaust system. It may depend on the geometry of the exhaust-gas path through the exhaust system, for example on the diameter of the exhaust-gas path and on curvatures and/or branches in the exhaust-gas path.

A "chronological sequence" of a multiplicity of temperature values in the component has at least two chronologically spaced-apart temperature values in the component. The temperature values may be ascertained at the same location in the component, though may also be ascertained at different locations of the component. The chronological sequence may be a chronologically continuous sequence of temperature values, though may also be a chronologically discrete sequence of temperature values. The sequence may include more than two, such as more than five, more than one hundred, more than one thousand or more than one hundred thousand temperature values. In the case of a chronologically discrete sequence, the time intervals between successive temperature values may be equal or they may differ from one another. For example, the sequence of the temperature value may be ascertained with a frequency of less than 10 Hz, such as less than 1 Hz and/or a frequency of greater than 1 Hz, such as greater than 10 Hz. Furthermore, modeling may be performed with a higher temporal resolution in particularly relevant subsections within the time segment, for example immediately before and after the starting of the internal combustion engine or immediately before and after the commencement of a regeneration of the particle filter, than in less relevant subsections.

The ascertainment of the chronological sequence of temperature values is based on the provided information items relating to the traveling route. For example, the required power of the drive, such as of the internal combustion engine, along the traveling route may be determined from the information items relating to the traveling route. From the power of the drive, such as of the internal combustion engine, it is possible in turn to determine the heat transfer from the drive to the component along the traveling route, and from this the temperature development in the component. The ascertainment of the chronological sequence may include a variation or optimization of the chronological sequence such that a given criterion or even several criteria relating to the temperature values in the component can be satisfied, wherein it is the intention for as little energy as possible to be expended and for the lowest possible level of pollutants to be emitted.

The "predefined future time segment" may be such as the time segment which the motor vehicle requires to cover the traveling route. It may however also designate only a part of the abovementioned time segment or else a longer time segment which for example also includes start-up and/or shutdown operations of the motor vehicle.

The "point in time" that is determined within the time segment may include any point in time within the time segment, such as also a multiplicity of points in time. In accordance with common linguistic usage, according to which the term "point in time" often refers to an extended period of time or a time interval, a point in time may also be used to mean a time interval within the time segment.

The point in time may lie within a time interval or else may denote a time interval in which a particular criterion for the temperature in a component must be satisfied, for example to ensure proper operation of the component. For example, the point in time may lie within a time interval or denote a time interval in which the temperature of an exhaust-gas aftertreatment device should lie within a particular temperature window in order to ensure proper exhaust-gas aftertreatment. This may for example be a temperature window for the regeneration of a particle filter or a temperature window for the conversion of pollutants in a catalytic converter.

A "criterion" is a condition which, at least under particular circumstances, can be identified as being satisfied or not satisfied. A criterion is satisfied when the associated condition is satisfied. A criterion may depend on one or more variables, for example an absolute temperature and/or a temperature difference. A criterion may take the form of a mathematical equation or a mathematical inequation. A criterion may also take the form of a system of equations made up of several equations and/or inequations. Furthermore, it may take the form of a decision tree which queries several sub-criteria sequentially or alternately. A criterion may also take the form of a table in which it can be looked up whether or not the criterion is satisfied for particular parameter or variable values. A criterion may specify a target value or setpoint value or a target range or setpoint range for a variable, for example a temperature window.

The criterion may for example have a temperature window or conversion window of a three-way catalytic converter, starting at the so-called light-off temperature, which is necessary for the onset of the conversion processes, up to a maximum admissible temperature, which for example ensures the protection of the catalytic converter and/or of further components in the exhaust system. The criterion may also have a temperature window of a $NO_x$ storage catalytic converter in which the latter can store corresponding pollutants. Such a temperature window of a $NO_x$ storage catalytic converter may, for example, lie between 250° C. and 500° C.

Furthermore, the criterion may have a temperature window in which a particle filter regeneration takes place in a particle filter, for example the burn-off of a filter cake. The particle filter regeneration may for example require temperatures above 600° C. with simultaneous availability of oxygen.

Finally, the criterion may have a temperature window that is required for the desulfurization of catalytic converters. The criterion may also have an operating temperature window for an SCR catalytic converter, which may for example lie between 180° C. and 550° C.

Criteria may require short-term, medium-term or long-term availability. There may consequently be a certain flexibility in the selection of the point in time at which the criterion should be satisfied. Correspondingly, the point in time may be determined with respect to the ascertained sequence of temperature values such that the criterion is already satisfied, or is at least approximately satisfied, at the point in time. It is then the case that no or only little additional energy expenditure is required to satisfy the criterion, wherein the additional energy expenditure may be provided for example by a heating device or by the drive, such as the internal combustion engine. The flexibility may be greater in the case of long-term attainability than in the case of short-term attainability.

For example, the previously described temperature window of a three-way catalytic converter may require short-term attainability in order to ensure sufficient conversion of pollutants already during or at least shortly after activation of the internal combustion engine. By contrast, the temperature window for regeneration of a particle filter may require only long-term attainability. Accordingly, the specific point in time for a particle filter regeneration can be planned in the long term and selected with a certain degree of flexibility.

A "heat source" for the exhaust system may be any object that is capable of supplying heat to and/or extracting heat from the exhaust system. The heat source may, but does not have to be, located in the exhaust system. Each heat source may also be a cold source or may be used as a cold source, depending on the temperature of the heat source and the temperature of the region or object to be heated or cooled. The drive, such as the internal combustion engine, constitutes a heat source for the exhaust system and such as for components in the exhaust system. Here, the heat may be transferred from the internal combustion engine to the component such as by way of convection via the exhaust gas.

An "actuation" of a device or a system refers to any form of influencing of the device or the system, such as physical influencing. The actuation may influence one or more variables or parameters that characterize a state of the device or of the system. Such a state may be characterized for example by geometrical or spatial relationships, by electromagnetic relationships and/or by thermal relationships. An actuation can bring about a change in the state of the device or of the system, though may also include the maintenance of a state. The actuation may include the maintenance of a state such as if, in principle, there would be the possibility of changing the state. For example, an actuation may mean that a device remains switched off. An actuation may for example mean the supply of energy, for example mechanical, electrical or thermal energy. An actuation may take place with the aid of a control unit that transmits control signals to the device or the system. Various predefined and/or measured variables or parameters may be taken into consideration in the actuation.

The actuation of a heat source can include for example the actuation of a drive, such as of an internal combustion engine, wherein the drive provides heat, such as heat for components in the exhaust system. This heat may be transferred to the components such as via exhaust gases of the drive, or else by thermal radiation or thermal conduction, for example along the components of the exhaust system. The actuation of the drive may include the setting of a supply of energy to the drive, for example the actuation of an internal combustion engine may include the setting of a supply of fuel to the internal combustion engine.

Alternatively or additionally, the actuation of a heat source may include the actuation of a heating device. For example, the actuation of the heating device may mean the supply of a determinable, variable amount of energy to the heating device, such as an amount of energy that leads to a predefined heating power. In some examples, in the case of the actuation of a heating device, this heating device may be supplied with energy such that the heating device warms up. In the actuation, it is however also possible for no energy to be supplied, and the heating device may for example remain deactivated for as long as there would, in principle, be the possibility of supplying energy. The actuation of a heating device may include the adjustment of an actual temperature value to a setpoint temperature value or the adjustment of an actual temperature value into a setpoint temperature range.

With the method according to the first aspect of the disclosure, temperature management for one or more components in the exhaust system of an internal combustion engine can be implemented. Such temperature management may be useful for reasons of energy efficiency, but also to ensure the proper functioning of components in the exhaust system and/or to prevent damage to or severe wear of components.

For example, it may be necessary for the temperature in an exhaust-gas purification device to have a particular value, such as to be above a predefined minimum operating temperature. For example, particular chemical and/or physical processes for exhaust-gas purification in the exhaust-gas purification device, such as for the conversion or filtering of pollutants, can require a certain minimum temperature. It may accordingly be necessary for a temperature in the exhaust-gas purification device to lie above an activation temperature of the respective processes. Furthermore, a regeneration or restoration of an exhaust-gas purification device may require a certain minimum temperature, which may indeed differ from the abovementioned activation temperature. Temperature windows for the exhaust-gas after-treatment may have to be maintained permanently or over relatively long time segments, for example throughout the operation of the internal combustion engine, or only periodically at recurring intervals, for example for the regeneration of an exhaust-gas aftertreatment device.

The ascertainment or selection of one or more points in time at which the temperature in a component has to satisfy one or more criteria can be performed in a particularly energy-efficient manner according to the first aspect of the disclosure. For this purpose, the criteria for the temperature may be compared with the ascertained sequence of temperature values, and a good or optimum point in time may be selected in relation to the ascertained sequence. This may for example be a point in time at which the ascertained temperature values already satisfy the required criterion in any case, or the required criterion can be satisfied with only little additional energy expenditure. For example, points in time for the conversion of pollutants and/or the regeneration of exhaust-gas aftertreatment devices may be selected such that as little energy as possible has to be expended in order to attain the required temperature window.

One or more heat sources may be used for the temperature management in the exhaust system, for example the internal combustion engine and/or a heating device, such as an electrical heating device. Here, different heat sources can have different advantages and disadvantages, for example different efficiencies or different positioning in the internal combustion engine. A heat source may be explicitly designed as a heating device or the heat may be a by-product that arises for example during the generation of drive power. According to the first aspect of the disclosure, the properties of one or more heat sources may be used in a targeted manner in order to make the temperature management as efficient as possible. Efficient temperature management based on several heat sources may be made possible for example through the use of a heatable catalytic converter.

For efficient, such as energy-efficient, temperature management on a planned traveling route, it is expedient if the most extensive possible information items relating to the traveling route are available. Such information items are provided for example by modern driver assistance systems. The information items allow modeling, such as a model-based prediction, of the temperature development in components of the exhaust system along the traveling route. Accordingly, heat sources can be actuated over the traveling route, and time windows for temperature-dependent processes in the components can be selected, such that energy-efficient temperature management is made possible.

Temperature management according to the first aspect of the disclosure may be advantageous for example in the case of hybrid motors, because in these the internal combustion engine may also be inactive for relatively long periods of time and accordingly does not provide any heat for the components in the exhaust system.

In some implementations, the ascertainment of the chronological sequence furthermore includes determining a heat quantity profile of a heat quantity which is supplied to the component within the time segment. Here, the heat quantity is generated by the drive and the ascertainment of the chronological sequence is based on the heat quantity profile.

A "profile" may be defined here similarly to the chronological sequence already discussed. In some examples, the profile may have at least two chronologically spaced-apart values. The profile may be a temporally continuous or a temporally discrete sequence of values. The heat quantity profile may represent the heat quantity as a function of time and/or as a function of the position of the vehicle on the traveling route.

The chronological sequence of temperature values in the component is thus ascertained on the basis of the heat quantity that is supplied to the component by the drive, wherein the drive may for example have an internal combustion engine and/or an electric motor. For the ascertainment of the heat quantity profile, consideration may be given such as to those sections of the traveling route in which an internal combustion engine is to be activated. The heat contribution from other types of drive, such as an electric motor, may be small in relation to the internal combustion engine. The heat released from the internal combustion engine is dependent on the power of the internal combustion engine and the efficiency of the internal combustion engine.

Furthermore, those sections of the traveling route in which the internal combustion engine is deactivated may be taken into consideration insofar as the lack of heat contribution from the internal combustion engine can result in a temperature drop in the component.

In summary, the explicit determination of the heat contribution of the drive, such as of the internal combustion engine, allows a reliable and exact ascertainment of the chronological sequence of the temperature value. Consideration may self-evidently also be given to further heat contributions from other heat sources, for example of an electrical heating device.

In some implementations, the method also includes determining a power profile of a power output of the drive, such as of the internal combustion engine, within the time segment. Here, the ascertainment of the chronological sequence is based on the power profile.

The power profile, a so-called drive power profile, may represent the power of the drive as a function of time and/or as a function of the position of the vehicle on the traveling route. The determination of the power profile may take into consideration a maximum power of the drive that cannot be exceeded throughout the entire power profile. The determination of the heat quantity profile may be based on the power profile because the heat quantity released from the drive, such as from the internal combustion engine, is dependent on the power of the drive, taking into consideration the efficiency. Correspondingly, the ascertainment of the chronological sequence of temperature values may be based on the power profile, because the chronological sequence may be based on the heat quantity profile.

The determination of the power profile of the drive may include determining the power profile of different types of drive. For example, in the case of a hybrid motor, the power profile of an electric drive and/or the power profile of an internal combustion engine may be determined. The determination of the power profile may also take into consideration the energy requirement of other consumers in addition to the one or more drives, such as the energy requirement of a heating device for the exhaust system.

The determination of the power profile may include determining qualitatively different phases or sections on the traveling route. These sections or phases may differ for example with regard to which drives are active or inactive, for example whether the internal combustion engine and/or an electric drive are active or inactive. They may also differ with regard to an acceleration behavior of the vehicle. For example, sections with constant speed can be distinguished from sections with acceleration and/or braking operations. Sections in which braking operations take place can be considered separately because recuperation, that is to say energy recovery, can take place in these. Furthermore, a distinction may be made between sections in which particular types of drive are imperatively necessary and other sections in which the type of drive can be selected, for example in order to optimize energy consumption. Finally, sections can be identified in which only part of the maximum achievable power of a drive is required.

In summary, the explicit determination of the power profile of the drive allows a reliable and exact ascertainment of the chronological sequence of temperature values and an optimization of drive strategies with regard to energy efficiency and pollutant reduction.

In some implementations, the determination of the power profile is based on the information items relating to the future traveling route. Various properties of the traveling route can influence the power profile. For example, an altitude profile of the traveling route can determine whether, for example in the case of an uphill gradient, the internal combustion engine is imperatively necessary or whether, in the case of a downhill gradient, the internal combustion engine can be switched into an inactive state. Maximum speeds on the traveling route can likewise be indicative of whether the internal combustion engine will be activated. For example, the internal combustion engine may be active on a freeway section without a speed limit, whereas an electric drive may be sufficient in a 30 km/h zone. Speed limits can also be indicative of an acceleration or braking behavior of the vehicle, which in turn can influence the power profile. Information items relating to obstacles on the traveling route, such as roadworks, slow-moving traffic, traffic jams, traffic signal cycles, roundabouts or other types of traffic movements, can likewise be indicative of an acceleration or braking behavior and thus of the power profile.

In some examples, the method further includes determining a speed profile of the motor vehicle within the time segment. Here, the determination of the power profile is based on the speed profile.

The speed profile may represent the speed of the vehicle as a function of time and/or as a function of the position of the vehicle on the traveling route. The determination of the speed profile may be based on the information items relating to the traveling route. Here, admissible maximum speeds on the traveling route may be taken into consideration, as may obstacles on the traveling route such as roadworks, slow-moving traffic, traffic jams, traffic signal cycles, roundabouts or other types of traffic movements. The speed profile may, in the case of fully autonomous driving, be determined taking into consideration low or optimum energy and/or fuel consumption. In the case of driving operation that is not fully autonomous, the type of driver of the motor vehicle may also be taken into consideration. For this purpose, data from previous driving cycles may also be incorporated. The speed profile may also be determined using methods of artificial intelligence.

The power profile may be determined on the basis of the speed profile. In some examples, acceleration and braking operations may be used for the determination of the power profile. In some examples, a so-called driving resistance curve may be used for this. Data from standardized measuring methods for determining exhaust-gas emissions and/or fuel/electricity consumption of motor vehicles may also be used for the determination of the power profile on the basis of the speed profile. Such standardized measuring or test methods may be used for example in the certification of vehicles, or serve for the ascertainment of a characteristic driving behavior of a vehicle, such as the coasting behavior, under defined boundary conditions.

A determination of the power profile on the basis of the speed profile can ensure accurate and reliable data relating to the required power along the traveling route.

In some implementations, the method also includes providing further information items which are indicative of the motor vehicle. Here, the determination of the power profile is based on the further information items, and the further information items may include a driving resistance curve of the motor vehicle.

In addition or as an alternative to the information items relating to the traveling route, further information items relating to the motor vehicle may be used for the determination of the power profile. The further information items may for example include the vehicle mass, such as the present vehicle mass. This may be ascertained for example with the aid of sensors, for example with the aid of seat occupancy sensors, interior cameras, seat belt sensors, sensors on fastening brackets or holders. In this way, a present payload of the vehicle can be determined and added to a predefined vehicle curb weight.

The further information items may include a driving resistance curve. The driving resistance curve denotes the sum of the resistances that a motor vehicle has to overcome by way of its drive power in order to drive at a constant speed or at an accelerated speed. Here, the route traveled may be horizontal or inclined. The driving resistance may be made up of an air resistance, a rolling resistance, a gradient resistance and/or an acceleration resistance. The driving resistance curve, such as at curb weight, may be stored in a vehicle-specific table. The driving resistance curve may also be ascertained on the basis of data from past journeys. In some examples, the driving resistance curve may be determined on the basis of data from the abovementioned standardized measuring or test methods.

The driving resistance curve may be corrected on the basis of the present payload of the vehicle. Further corrections may result from a present equipment configuration of the vehicle, for example the type of tire used. The present tire pressure may also be taken into consideration. Special conditions such as a trailer or a roof rack may be detected directly or indirectly by way of sensors and taken into consideration by way of corresponding corrections to the driving resistance curve. Finally, present weather conditions may also be taken into consideration as correction factors for the driving resistance curve, for example outside temperature, wind strength and wind direction and also precipitation such as rain or snow. Furthermore, the road condition may also be taken into consideration, for example by way of the road surface or precipitation.

With the aid of the driving resistance curve, the power profile can be determined on the basis of the information items relating to the traveling route and/or on the basis of the speed profile.

In some implementations, the determination of the power profile involves a variation (optimization) of the power profile, such that an energy consumption of the drive is reduced and/or is as low as possible.

The variation of the power profile may include a variation of the drive strategy, for example whether an internal combustion engine is used and/or whether an electric drive is used. Here, the drive strategy may be varied such that as little energy as possible is expended for the traveling route. In addition, the drive strategy may be varied such that particular predefined criteria for temperature values of components of the exhaust system are satisfied at predefined points in time. In addition, the actuation of one or more heat sources, for example of the internal combustion engine and/or of an electrical heating device, may be varied, for example varied such that as little energy as possible is consumed.

The energy consumption may be the total energy expended along a predefined traveling route. It may be made up of the energy consumption of one or more drive types of the drive. For example, the energy consumption may include the energy consumed by an internal combustion engine. The energy consumption of the internal combustion engine may be determined for example on the basis of the fuel consumption. Additionally or alternatively, the energy consumption may include the (electrical) energy consumed by an electric motor. The (electrical) energy for the electric motor may be stored for example in an accumulator. The energy to be consumed may be fed into one or more energy stores of the vehicle in various ways, for example as fuel in a fuel tank and/or as electrical energy from an electrical grid into an accumulator or a battery.

In some implementations, the determination of the point in time is based on the power profile.

Various demands on the exhaust-gas aftertreatment system of the internal combustion engine may be determined from the power profile of the drive, such as from the power profile of the internal combustion engine. In some examples, from the power profile, it is possible to ascertain points in time or time windows at or in which the temperatures in one or more components of the exhaust system should satisfy particular criteria, for example that particular temperature windows are adhered to.

For example, such points in time or time windows may be determined on the basis of untreated emissions models, wherein the untreated emissions models model an emission of pollutants as a function of the power of the internal combustion engine. On the basis of such power-dependent emissions, it can for example be determined when the temperature in a catalytic converter should adhere to a particular temperature window such that pollutants are converted to the intended extent, for example the pollutant emissions remain below certain limit values. On the basis of the modeled emissions, it is for example also possible to determine the degree of the loading of a particle filter and when the temperature in the particle filter should lie within a particular temperature window that is required for the regeneration of the particle filter.

The determination of the point in time may include a variation of the point in time such that required criteria for the temperature values in one or more components of the exhaust system can be satisfied with a reduced or lowest possible energy expenditure. For example, the regeneration of the particle filter may be carried out in a freeway section in which the required high temperatures are very likely to be achieved.

In some implementations, the drive has an internal combustion engine.

The drive may alternatively or additionally have an electric motor. In some examples, the drive may be a hybrid drive that combines different types of drive. Temperature management is particularly advantageous in the case of hybrid drives that include an internal combustion engine. In the case of hybrid drives, temperatures in the exhaust system can fall below the required threshold values such as when the internal combustion engine is inactive and thus provides little or no heat for the exhaust system.

In some implementations, the method also includes determining a fuel consumption of the internal combustion engine on the basis of the power profile. Here, determination of the power profile includes a variation (optimization) of the power profile such that the fuel consumption of the internal combustion engine is reduced and/or as low as possible.

The variation of the power profile may include a variation of the drive strategy, for example whether an internal combustion engine is used and/or whether an electric drive is used. Here, the drive strategy may be varied such that as little fuel as possible is consumed on the traveling route. In addition, the drive strategy may be varied such that particular predefined criteria for temperature values of components of the exhaust system are satisfied at predefined points in time. In addition, the actuation of one or more heat sources, for example of the internal combustion engine and/or of an electrical heating device, may be varied, such as varied such that as little fuel as possible is consumed.

In some implementations, the point in time is determined such that an emission of a pollutant from the exhaust system, such as an emission averaged over the time segment, is reduced and/or must satisfy a predefined limit value.

In the determination of the point in time, for example on the basis of untreated emissions models of the drive, it can be taken into consideration that the emission of pollutants from the exhaust system must be as low as possible and/or must satisfy predefined limit values, for example legal limit values, for the respective pollutants. For example, a catalytic converter should have reached the required operating temperature already before a predicted activation of an internal combustion engine in order to convert pollutants as early as in the starting phase of the internal combustion engine. As a further example, the temperature value in a particle filter should have reached a temperature required for regeneration of the particle filter, and the regeneration process should be started, before the degree of loading of the particle filter with pollutants has exceeded a predefined threshold value.

The power profile may be varied such that the emission of pollutants is as low as possible, with a simultaneous minimization of the energy consumption.

In some implementations, the pollutant may have at least one of carbon monoxide, carbon dioxide, nitrogen oxides, ammonia, hydrocarbons, soot particles and fine dust.

Carbon monoxide, nitrogen oxides, ammonia, hydrocarbons, soot particles and fine dust are typical pollutants, the emission of which is reduced or minimized by way of exhaust-gas aftertreatment devices. Here, the respective limit values, for example legal limit values, should be complied with.

A main heat source for temperature management in the exhaust system may be the drive. In some examples, a main heat source may be an internal combustion engine. Thus, the gas flow generated by the internal combustion engine through the exhaust system may be used for regulating the temperature of components in the exhaust system. The temperature regulation by way of the gas flow can depend on a flow velocity, on any turbulence that may occur in the gas flow, and on the temperature of the gas flow. The velocity and the temperature of the gas flow through the exhaust system are dependent for example on the fuel supply to the engine. In some examples, the fuel supply can be shut off, and combustion processes in the engine can accordingly be deactivated.

Using the internal combustion engine as a heat source for the exhaust system can be advantageous for example if the internal combustion engine is used for the drive of the vehicle in any case. The heat is then generated as a by-product, without additional energy having to be expended for the warming of the exhaust system. However, the internal combustion engine can also be activated explicitly for the warming of the exhaust system.

In some examples, the heat source has a heating device, such as an electrical heating device.

A "heating device" is any component, device or system that serves for controlling the temperature at a predefined location, such as for increasing the temperature, for example for supplying heat to an object or a compartment region. A heating device may furthermore be designed to extract heat from an object or a compartment region. The heat may be produced in the heating device and/or it may be transferred into the heating device. The heating device may be an electrical heating device, for example a resistance heater by way of a heating resistor or an induction heater. The heating device may however also be heated using fuels such as gas, gasoline or oil. The heating device may for example be a heating disk, such as a heating disk in a catalytic converter.

If the fuel supply to the internal combustion engine is shut off, the temperature of any gas flow through the exhaust system may lie below the required operating temperature and/or regeneration temperature of at least some components in the exhaust system. In other words, in such a case, the gas flow cannot be used to heat a component to the operating temperature and/or regeneration temperature, but can be used only to cool overheated components and/or to compensate for temperature differences. Consequently, the use of heating devices as further heat sources in components of the exhaust system can prove useful for heating components to an operating temperature or regeneration temperature, and/or maintaining the operating temperature or regeneration temperature, when the fuel supply has been shut off.

An actuation strategy of the heating device may be optimized with regard to the most extensive possible reduction of pollutants whilst at the same time taking energy efficiency into consideration. The actuation strategy of the heating device may be optimized for example with regard to the power profile. In the case of a catalytic converter that can be heated by an electrical heating device, advantages can arise for example upon a cold start of the internal combustion engine in order to accelerate the heating of the catalytic converter to operating temperature. Furthermore, an electric heating device may be advantageous in fuel-saving driving strategies, such as so-called "sailing" with the engine switched off, in order to maintain the operating temperature of the catalytic converter or to accelerate a return to the operating temperature. Electric heating devices may self-evidently also be arranged in other components of the exhaust system, for example in a particle filter. Furthermore, a heating device arranged upstream can always also be used in combination with the exhaust-gas flow to heat components that are situated downstream. Heating by electrical heating devices can exhibit better efficiency than heating by a drive, such as an internal combustion engine, at least if the drive is not being used at the same time for locomotion.

In some implementations, the heating device is operated at least partially by a supply of energy that is obtained by way of recuperation, such as by recuperation during a braking operation of the vehicle.

This may be advantageous in order to further minimize the energy expenditure for the traveling route, because the energy required for the heating device is provided by recuperation, that is to say by energy recovery from kinetic energy.

In some implementations, the component has at least one exhaust-gas aftertreatment device, such as a particle filter and/or a catalytic converter.

A "catalytic converter" serves for exhaust-gas aftertreatment, for example for exhaust-gas purification. It may be arranged in the exhaust system of an internal combustion engine. It may serve for converting and/or binding pollutants in the exhaust-gas flow. For example, hydrocarbon emissions, carbon monoxide emissions, nitrogen oxide emissions and/or particle emissions may be reduced. A corresponding operating temperature, such as an operating temperature window, may be required for optimum conversion and/or binding of the pollutants.

In the case of a catalytic converter, the heating device may be arranged in a front region in a flow direction of the exhaust gas, such as directly at the gas inlet of the catalytic converter. However, it may also be arranged in a rear region, for example at the gas outlet of the catalytic converter.

As a result of the heating, such as the electrical heating, of a catalytic converter, the exhaust-gas purification effect can commence earlier, which helps for example in gasoline engines to reduce the hydrocarbon emissions (HC) and particle emissions after a cold start. In the case of diesel engines, the focus is additionally on reducing carbon monoxide (CO) and nitrogen oxide (NOx) emissions.

A "particle filter" likewise serves for exhaust-gas aftertreatment, such as for exhaust-gas purification. It may be arranged in the exhaust system of an internal combustion engine. It can serve to filter out particles in the exhaust-gas flow, such as soot particles and agglomerations of soot particles with other substances, such as substances which are harmful to health.

In some implementations, the predefined criterion has the condition that the temperature value lies above a predefined temperature threshold value. The temperature threshold value may for example be a minimum operating temperature of a component in the exhaust system or a minimum regeneration temperature of a component in the exhaust system. For example, a purification process or a regeneration process of a component, for example a combustion process in a filter, such as a burn-off of a so-called filter cake, can commence at a minimum regeneration temperature.

The heat source is actuated such that the temperature value satisfies the predefined criterion, that is to say that the temperature value lies above the predefined threshold value, at a selected point in time. For example, the heat source may be activated or boosted for this purpose. A particular amount of energy may be supplied to the heat source for this purpose.

If the component is a catalytic converter, the temperature threshold may be set such that reliable catalysis of all relevant pollutants takes place. The so-called light-off temperature is then attained. Various properties of the exhaust gas generated during the combustion of the fuel, and the condition of the catalytically active coating of the component, may be taken into consideration here. In the case of gasoline engines, a temperature threshold value for an operating temperature of the catalytic converter may lie in the range from 150° C. to 300° C. In the case of compressed natural gas (CNG) engines, a temperature threshold may lie above 400° C.

If the component is a particle filter, the temperature threshold value may be set such that a regeneration of the particle filter can take place. For example, the temperature threshold may in this case lie between 450° C. and 650° C.

In some implementations, the predefined criterion has the condition that the temperature value lies below a further predefined temperature threshold value. The further temperature threshold value may for example be a maximum operating temperature of a component in the exhaust system or a maximum regeneration temperature of a component in the exhaust system. The predefined further temperature threshold value may be a temperature above which damage or excessive wear of a component is to be expected or is at least likely.

If the example described here is combined with the example presented above, the result is that the predefined temperature threshold value and the predefined further temperature threshold value form a temperature window for the temperature value. The criterion is then that the temperature value lies within or outside the temperature window, depending on whether the predefined temperature threshold value is lower or higher than the further predefined temperature threshold value.

The heat source is actuated such that the temperature value satisfies the predefined criterion, that is to say that the temperature value lies below the further predefined threshold value, at a selected point in time. For this purpose, the heat source may for example be deactivated or weakened. For this purpose, the energy supply to the heat source may be reduced or shut off entirely.

According to a further aspect of the disclosure, a control unit for actuating a heat source is described, which control unit is configured to carry out the method according to one of the abovementioned examples and implementations.

The control unit described is based on the recognition that, by way of such a control unit, one or more heat sources can be controlled in order to ensure energy-efficient temperature management for the exhaust system of a vehicle drive, with simultaneous monitoring of the pollutant emissions.

A "control unit" (controller) is configured to control predefined operations or processes. The control may be performed by way of signals, for example by way of electrical and/or optical signals. The control unit may have a processor in which processing operations are executed and the control signals are generated.

According to a further aspect of the disclosure, a motor vehicle is described which has a control unit according to the abovementioned aspect.

The motor vehicle described is based on the recognition that, by way of the associated control unit, one or more heat sources can be controlled in order to ensure energy-efficient temperature management for the exhaust system of the vehicle drive, with simultaneous monitoring of the pollutant emissions.

A "motor vehicle" may be any vehicle driven by an internal combustion engine, for example a motor car, a motorcycle or a tractor vehicle.

It should be noted that implementations and examples of the disclosure have been described with reference to different subjects of the disclosure. In some examples, some implementations of the disclosure are described by way of device claims and other implementations of the disclosure are described by way of method claims. However, it will become immediately clear to a person skilled in the art on reading this application that, unless explicitly stated otherwise, in addition to a combination of features which are associated with one type of subject matter of the disclosure, any combination of features which are associated with different types of subjects of the disclosure is also possible.

DESCRIPTION OF DRAWINGS

Like reference symbols in the various drawings indicate like elements.

DETAILED DESCRIPTION

Figure 1:
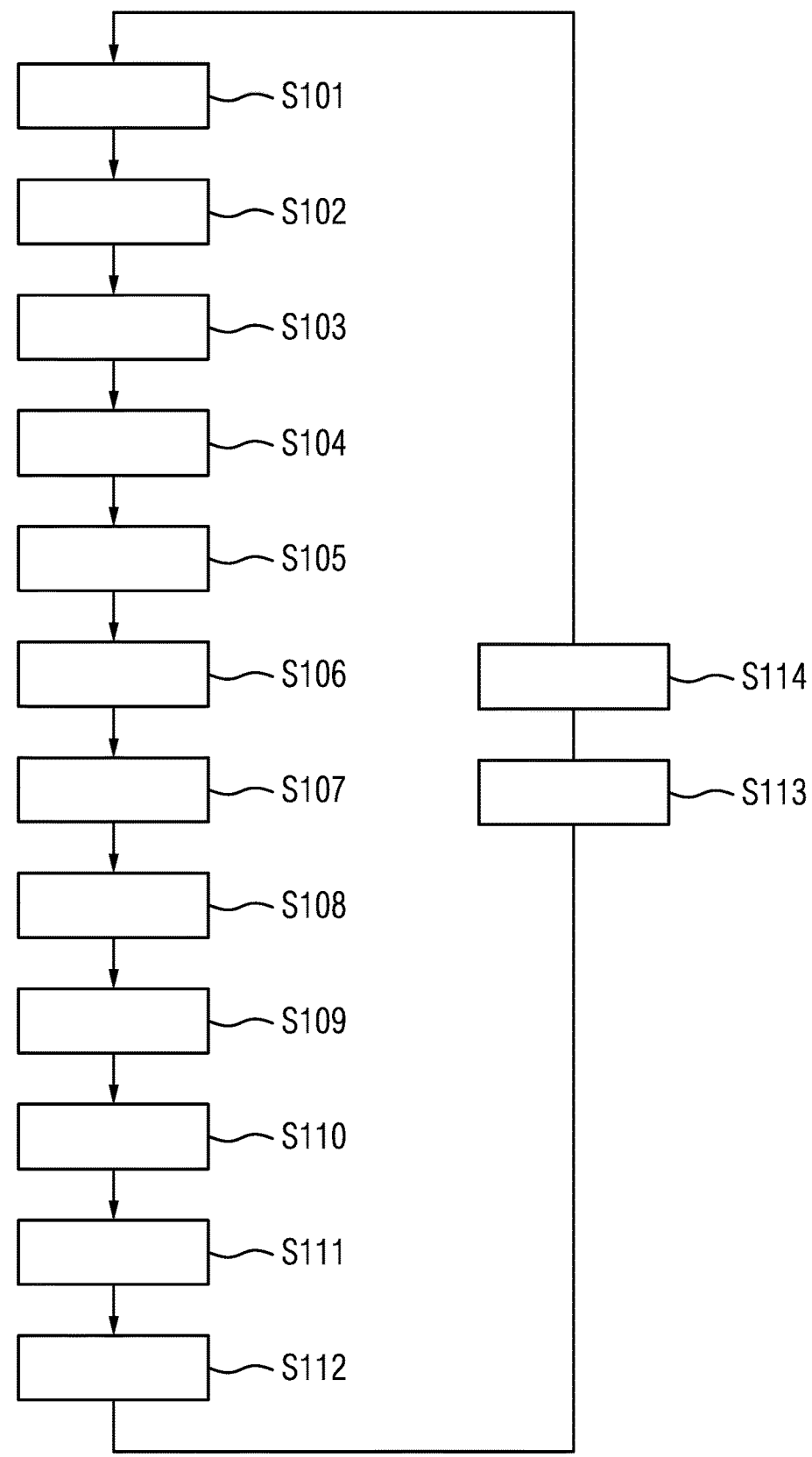
FIG. 1 shows a flow diagram of a method according to the disclosure.

Before the disclosure is described in more detail with reference to the drawings, some fundamental considerations will firstly be summarized.

The problem of energy-efficient actuation of heat sources for components in the exhaust system of a drive is solved through networking of various information items that are today, or will foreseeably in the future be, available in real time in the vehicle. These information items are available to the system in real time. One focus of the disclosure is on a high level of automated driving (up to and including fully autonomous driving). However, individual steps may also be used in the context of solving the problem during conventional driving operation, which is predominantly pre-selected by the driver, with limited information availability.

Important steps lie in the linking of information items to predict the use of heat sources which contribute to the temperature management of the exhaust-gas aftertreatment system. For this purpose, the speed profile of the driving cycle, and the contribution of the individual drives as drive and thermal power over the course of time, are predicted. Using the predicted local temperature profile of the exhaust-gas aftertreatment system, strategies for further reducing energy demand can be optimized over time without this resulting in a departure from the required temperature window. Furthermore, particular processes for maintaining the conversion, the regeneration or other processes dependent on temperature windows can be set in terms of the point in time, such that no additional energy expenditure is required for such processes.

One advantage lies in the fact that the requirements of the exhaust-gas aftertreatment system may be implemented with minimal energy by the drive strategy that is assumed to be optimal in terms of energy.

Here, the disclosure allows both short-term management and long-term management, which may relate to the present driving cycle but may also operate across multiple driving cycles. The short-term management makes corrections to the most recent predicted values and thus reacts to unpredictable cross-influences. The driving-cycle-related management and also the long-term management are made more precise by way of continuous updating in accordance with the actual profile.

One example is the regeneration of a particle filter. If this is not performed proceeding from ongoing driving operation (for example when driving on a freeway) because the required exhaust temperature window is not reached, this must be forced by way of additional energy expenditure. If such a point in time is approaching, the system can define the subsection in which the additional energy expenditure is minimal. Otherwise, the forced regeneration in accordance with the degree of loading of the particle filter (triggered by an exceedance of the threshold value) would possibly fall within a city driving section with low exhaust-gas temperatures and cause high additional energy consumption.

Another example is the optimum point in time for the activation of a heating disk in the exhaust-gas aftertreatment system in conjunction with the prediction of when the internal combustion engine will be activated for the first time in the driving cycle.

FIG. 1 shows a flow diagram of a method for actuating a heat source for a component of an exhaust system of a drive of a motor vehicle according to the disclosure.

The method is for the temperature management of an exhaust-gas aftertreatment system of a pollutant-emitting motor vehicle and has the following steps:

In a 1st step S101, the present vehicle mass is ascertained. The present vehicle mass may be ascertained by sensors that ascertain this quantity directly or indirectly. An indirect detection may be performed by seat occupancy sensors, interior cameras, seat belt sensors, sensors on fastening brackets or holders, by means of which the present vehicle mass is ascertained on the basis of the curb weight plus an estimated payload.

In a 2nd step S102, the driving resistance curve is determined. This may be stored in the form of a vehicle-specific database or derived from previous journeys using empirical values.

Workshop-specific information items (for example the type of tire used) and also other available information items such as tire pressure or outside temperature can increase the exactness of the driving resistance curve used hereinafter. Special cases such as the use of a trailer, roof rack, roof boxes can likewise be ascertained by sensors or indirectly and taken into consideration in the driving resistance curve. Here, present weather conditions (wind strength and direction, road condition owing to rain or snow, etc.) are incorporated generally or in certain sections. If known, the road condition can also be incorporated.

In a 3rd step S103, the traveling route, at least various information items relating to the traveling route, is/are provided. This can commonly be performed on the basis of the present position of the vehicle via GPS and the destination input by the vehicle driver via a human/machine interface (HMI). This means that the entire traveling route may be known to the system. However, it can likewise be sufficient to know subsections of the traveling route or to know the likely route on the basis of repeated trips.

In a 4th step S104, a speed profile is determined. On the basis of route maps with an exact altitude profile and information items from driver assistance systems, the speed profile is ascertained taking into consideration the admissible maximum speed and, on the basis of this, by way of the driving resistance curve, a power profile of the vehicle drive or drive power profile for the driving cycle that will foreseeably occur is ascertained. If the drive power profile exceeds the maximum power of the system, the speed profile is adapted accordingly. The acceleration or deceleration behavior of the vehicle can be implemented on the basis of networking-based energy management in the case of fully autonomous driving operation, or with incorporation of the identified driver/driver type. Taking into consideration present information items such as the local traffic density or known obstacles on the route (roadworks, slow-moving traffic or traffic jams, traffic light cycles, traffic movements around intersections such as roundabouts, etc.), this results in the predicted speed profile.

In a 5th step S105, the power profile of the drive or the drive power profile is determined. The drive power profile may be determined on the basis of aspects of energy efficiency and the available energy during the journey. In some examples, individual subsections, which are initially to be uniquely identified, may be ascertained with regard to the drive source used or the drive sources used or the strategy used.

In the case of a hybrid drive selected as an example, these may include inter alia the following subsections:

- subsections in which the vehicle rolls in relation to the admissible speed;
- subsections in which the vehicle sails in relation to the admissible speed, that is to say the electric drive is activated in order to maintain the speed;
- subsections in which the internal combustion engine is deactivated and purely electric driving takes place (for example temporary stop-and-go operation); subsections in which the internal combustion engine is reliably activated, for example because purely electric driving is in no case sufficient owing to an uphill gradient;
- subsections in which a deceleration to a standstill must take place after rolling operation. The event of a recuperation process is highly likely here. This is reliably foreseeable, for example in the case of stop signs on the route;
- subsections to which a drive power range can be assigned (for example in a 30 km/h zone, even under conceivable extreme conditions, it can be ruled out that the nominal power of the internal combustion engine will be demanded).

In a 6th step S106, a heat quantity profile is determined for a heat quantity which is generated by a drive and which is supplied to the exhaust system or to a component of the exhaust system. In all subsections in which a drive must imperatively be used in order to achieve the predicted speed profile, the heat contribution provided by this drive for heating up the exhaust-gas aftertreatment system is ascertained. In the case of the internal combustion engine, taking into consideration the efficiency, the power output correlates with the heat flow emitted, wherein $CO_2$-optimum operation, that is to say operation which is optimal with regard to the overall efficiency, is generally to be assumed.

In a 7th step S107, further sections of the heat quantity profile are determined. To all of the subsections ascertained in the 6th step S106 that contribute to the heating of the exhaust-gas aftertreatment system, there are added the subsections in which the temperature of the exhaust-gas aftertreatment system reliably decreases owing to a lack of heat input.

In an 8th step S108, the specific requirements of the exhaust-gas aftertreatment system are ascertained in model-based fashion from the predicted power profile. For example, time windows are specified in which particular temperature windows should be attained in the exhaust-gas aftertreatment system. This 8th step S108 may take place with the incorporation of untreated emissions models of the internal combustion engine. In addition, it is for example possible to define a catalytically active partial volume of a catalytic converter which is required in order to convert the pollutant mass flow, which is coupled to the power profile, in the exhaust-gas aftertreatment system to a high degree. The increase in the loading of a particle filter can likewise be predicted by way of this.

In a 9th step S109, it is determined when a temperature value in the exhaust system satisfies particular predefined criteria. In some examples, all subsections of the driving profile or the traveling route in which a required temperature window is reliably attained can be ascertained on the basis of the 8th step S108. If this is the case, it can also be checked whether the further conditions for the conditioning of the exhaust-gas aftertreatment system can with high probability be implemented in the subsection. For example, a freeway section without a speed limit can with high probability be used for a particle filter regeneration owing to the certain use of the internal combustion engine in the case of current hybrid systems and the high exhaust-gas temperatures.

In a 10th step S110, it is determined when a temperature value in the exhaust system does not satisfy particular predefined criteria. In a reversal of the 9th step S109, it is now possible to ascertain those subsections of the driving profile that may possibly lead to a departure from a required temperature window. It is possible to ascertain subsections in which entry into the temperature window will become imperatively necessary in order that no excessive pollutant emissions, an inadmissible reduction in efficiency of parts of the exhaust-gas aftertreatment system or even (partial) damage to the system occurs (so-called temperature-critical subsections).

In an 11th step S111, it is checked whether the subsections ascertained in the 10th step S110 can be shortened or avoided in an energy-neutral manner by way of a change in the power profile, such as in the drive strategy, and thus in the higher-level thermal management. If this is possible, the power profile, such as the planned drive strategy, is corrected accordingly.

In a 12th step S112, heat sources are actuated such that temperature values in the exhaust system satisfy predefined criteria at a predefined point in time. Such a heat source may for example be the internal combustion engine of the vehicle or an electrical heating device, for example a heating disk, in the exhaust system. For the remaining temperature-critical subsections, the strategy as to how the exhaust-gas aftertreatment system or parts thereof may be brought into the temperature window is ascertained by analyzing the likely status of the heat sources/sinks available at the point in time. Here, the variant that allows the least expenditure of energy for the raising or lowering of the temperature level is preferentially chosen.

In preparation for travel, steps 1 to 12 may be used to predict drive, energy and thermal management for the entire journey, taking into consideration any information items available in the system or provided by networking.

In a 13th step S113 and a 14th step S114, deviations from the predicted profile are taken into consideration. Such deviations may result from all of the influencing factors that were not included in the prediction. These are primarily those that have a short-term and rather random influence on the course of travel (for example a required vehicle deceleration owing to unpredictable events and obstacles occurring on the road or along the route). Therefore, the predicted setpoint profile of the relevant variables, for example the traveling route, the chronological sequence of the temperature value, the speed profile and/or the power profile, must be continuously compared with the real driving profile.

Here, in the 13th step S113, a continuous short-term adaptation of the strategies is performed in order that the required operation of the exhaust-gas aftertreatment system can take place in a precisely accurate manner.

In the 14th step S114, the adaptations made in step 13 are taken into consideration in the predicted profile. In parallel with the respectively presently occurring driving operation, steps 1 to 12 are carried out continuously in order to update and refine the forecast. Furthermore, the information items learned during one driving cycle may be incorporated into the precalculation of the next driving cycle by the system.

Figure 2:
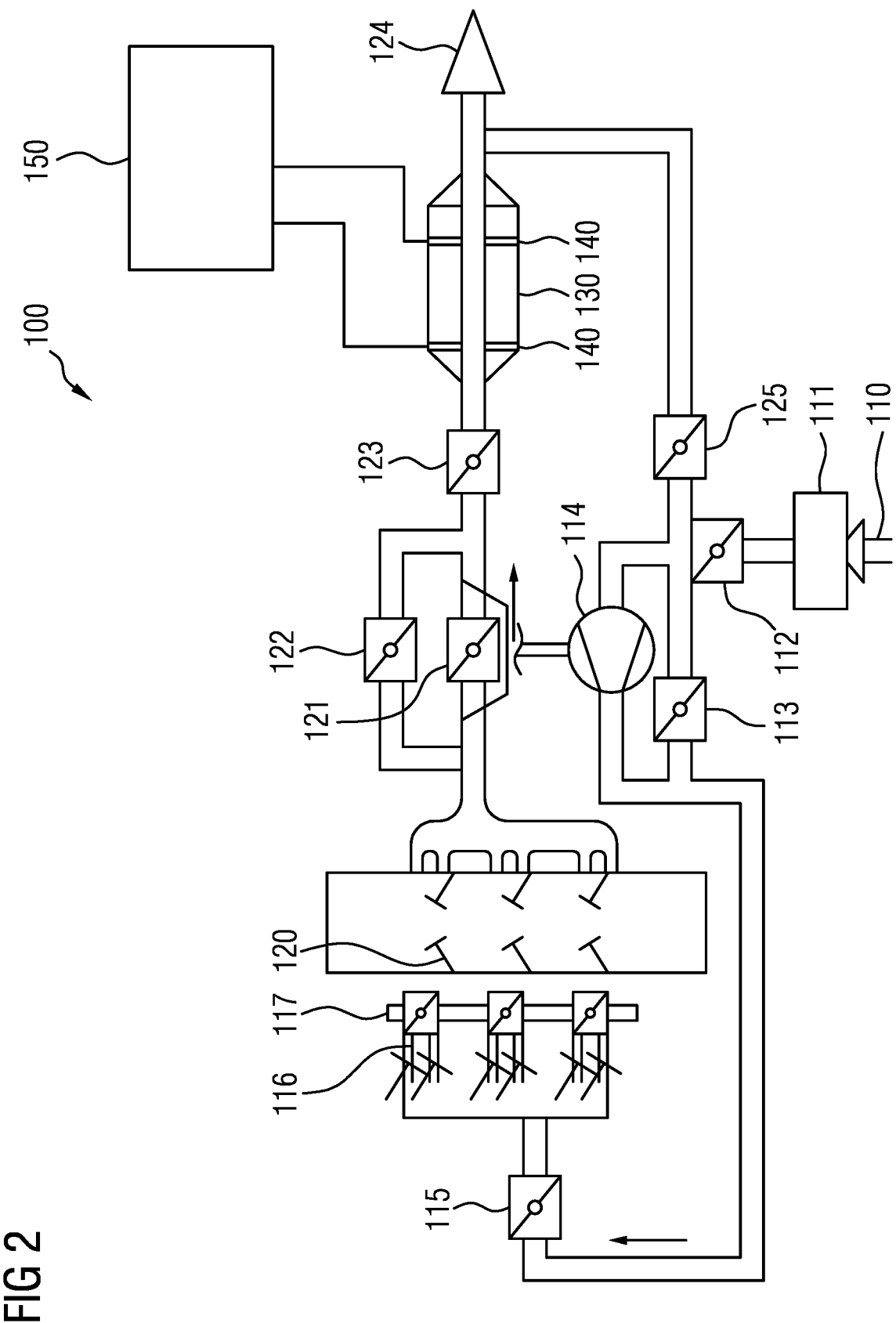
FIG. 2 schematically shows a detail of an internal combustion engine of a vehicle according to the disclosure.

FIG. 2 schematically shows a detail of an internal combustion engine 100 of a vehicle according to the disclosure.

A fresh-air path of the internal combustion engine 100 begins at the gas inlet 110 of the internal combustion engine, at which an air filter 111 is arranged. The supply of fresh air to the engine can be adjusted, and thus the cylinder charging can be influenced, by various active or passive adjusting elements in the fresh-air path. Such adjusting elements are for example throttle flaps 112, 115, air recirculation flaps 113, air cycle valves 116, swirl or tumble flaps 117 or a compressor 114 of an exhaust-gas turbocharger.

The gas supply into the exhaust system of an internal combustion engine can be adjusted by a fully or partially variable valve drive 120. In some examples, the gas flow (exhaust-gas mass flow) through various components in the exhaust system, for example through a catalytic converter 130, can be controlled in closed-loop fashion and fluidically influenced by various active or passive adjusting elements in the gas path of the exhaust system. Such adjusting elements are for example exhaust-gas flaps 123, a wastegate 122 or a variable turbine geometry (VTG) actuator 121 in the turbine of an exhaust-gas turbocharger.

An exhaust-gas recirculation (EGR) arrangement can produce a connection between the exhaust system and the fresh-air path. The connection may branch off upstream of the catalytic converter (high pressure EGR) or downstream of the catalytic converter (low pressure EGR). The exhaust-gas recirculation arrangement may be controlled in closed-loop fashion for example by EGR valves or EGR flaps 125.

The catalytic converter 130 includes a heating device 140 with heating elements, for example heating disks. An electronic control unit 150 controls the fuel supply to the internal combustion engine 100, the heating device 140 and the active and passive adjusting elements in the gas path between gas inlet 110 and gas outlet 124.

A number of implementations have been described. Nevertheless, it will be understood that various modifications may be made without departing from the spirit and scope of the disclosure. Accordingly, other implementations are within the scope of the following claims.

What is claimed is:

1. A method executed by a control unit for actuating a heat source for a component of an exhaust system of a drive of a motor vehicle, the method comprising:
   determining a current vehicle mass of the motor vehicle;
   providing information items relating to a future traveling route of the motor vehicle;
   determining a power profile of a power of the drive within a predefined future time segment, the power profile based on the vehicle mass;
   ascertaining a chronological sequence of a multiplicity of temperature values in the component within the time segment, wherein the ascertainment of the chronological sequence is based on the provided information items and the power profile;
   determining a point in time within the time segment on the basis of the ascertained chronological sequence, wherein a temperature value of the multiplicity of temperature values which is assigned to the point in time is intended to satisfy a predefined criterion; and
   actuating the heat source before the point in time such that the temperature value satisfies the specified criterion at the point in time, wherein actuating the heat source results in energy-efficient temperature management for the exhaust system of the drive of the motor vehicle.

2. The method as claimed in claim 1, wherein the ascertainment of the chronological sequence comprises:
   determining a heat quantity profile of a heat quantity which is supplied to the component within the time segment,
   wherein the heat quantity is generated by the drive and wherein the ascertainment of the chronological sequence is based on the heat quantity profile.

3. The method as claimed in claim 1, wherein the determination of the power profile is based on the information items relating to the future traveling route.

4. The method as claimed in claim 1, furthermore comprising:
   determining a speed profile of the motor vehicle within the time segment, wherein the determination of the power profile is based on the speed profile.

5. The method as claimed in claim 1, furthermore comprising:
   providing further information items which are indicative of the motor vehicle, wherein the further information items comprise a driving resistance curve of the motor vehicle;
   wherein the determination of the power profile is based on the further information items.

6. The method as claimed in claim 1, wherein the determination of the power profile includes a variation of the power profile such that an energy consumption of the drive is reduced.

7. The method as claimed in claim 1, wherein the determination of the point in time is based on the power profile.

8. The method as claimed in claim 1, wherein the drive has an internal combustion engine.

9. The method as claimed in claim 8, furthermore comprising:
   determining a fuel consumption of the internal combustion engine on the basis of the power profile,
   wherein the determination of the power profile comprises a variation of the power profile such that the fuel consumption of the internal combustion engine is reduced.

10. The method as claimed in claim 1, wherein the point in time is determined such that an emission of a pollutant from the exhaust system is reduced, the emission of the pollutant being an emission averaged over the time segment.

11. The method as claimed in claim 10, wherein the pollutant has at least one of carbon monoxide, carbon dioxide, nitrogen oxides, ammonia, hydrocarbons, particles and fine dust.

12. The method as claimed in claim 1, wherein the heat source has the drive.

13. The method as claimed in claim 12, wherein the heat source furthermore has a heating device being an electrical heating device.

14. The method as claimed in claim 13, wherein the heating device is operated at least partially by a supply of energy that is obtained by recuperation during a braking operation of the vehicle.

15. The method as claimed in claim 1, wherein the component has at least one exhaust-gas aftertreatment device including a particle filter and/or a catalytic converter.

16. The method as claimed in claim 1, wherein the predefined criterion has a condition that the temperature value lies above a predefined temperature threshold value.

17. The method as claimed in claim 1, wherein the predefined criterion has a condition that the temperature value lies below a predefined further temperature threshold value.

18. A control unit for actuating a heat source for a component of an exhaust system, the control unit configured to execute a method comprising:
   determining a current vehicle mass of the motor vehicle;
   providing information items relating to a future traveling route of a motor vehicle;
   determining a power profile of a power of the drive within a predefined future time segment, the power profile based on the vehicle mass;
   ascertaining a chronological sequence of a multiplicity of temperature values in the component within the time segment, wherein the ascertainment of the chronological sequence is based on the provided information items;
   determining a point in time within the time segment on the basis of the ascertained chronological sequence, wherein a temperature value of the multiplicity of temperature values which is assigned to the point in time is intended to satisfy a predefined criterion; and
   actuating the heat source before the point in time such that the temperature value satisfies the specified criterion at the point in time.

19. A motor vehicle having a control unit for actuating a heat source for a component of an exhaust system, the control unit configured to execute a method comprising:
   determining a current vehicle mass of the motor vehicle;
   providing information items relating to a future traveling route of the motor vehicle;
   determining a power profile of a power of the drive within a predefined future time segment, the power profile based on the vehicle mass;
   ascertaining a chronological sequence of a multiplicity of temperature values in the component within the time segment, wherein the ascertainment of the chronological sequence is based on the provided information items;
   determining a point in time within the time segment on the basis of the ascertained chronological sequence, wherein a temperature value of the multiplicity of temperature values which is assigned to the point in time is intended to satisfy a predefined criterion; and
   actuating the heat source before the point in time such that the temperature value satisfies the specified criterion at the point in time.

* * * * *